United States Patent
Gibbs et al.

(10) Patent No.: US 7,345,456 B2
(45) Date of Patent: Mar. 18, 2008

(54) POWER SYSTEM STABILIZER PROVIDING EXCITATION LIMITER FUNCTIONS

(75) Inventors: Irving A. Gibbs, Fletcher, NC (US); Charles R. Mummert, Hendersonville, NC (US)

(73) Assignee: Basler Electric Company, Highland, IL (US)

( * ) Notice: Subject to any disclaimer, the term of this patent is extended or adjusted under 35 U.S.C. 154(b) by 0 days.

(21) Appl. No.: 11/041,595

(22) Filed: Jan. 24, 2005

(65) Prior Publication Data
US 2006/0164045 A1    Jul. 27, 2006

(51) Int. Cl.
*H02P 9/10* (2006.01)

(52) U.S. Cl. .............. 322/19; 322/37; 361/20

(58) Field of Classification Search ............ 322/19, 322/20, 25, 28, 44, 45, 99, 37; 361/20, 21
See application file for complete search history.

(56) References Cited

U.S. PATENT DOCUMENTS

| | | | |
|---|---|---|---|
| 3,916,291 A * | 10/1975 | Raczkowski ........... | 322/19 |
| 4,245,182 A | 1/1981 | Aotsu et al. | |
| 4,326,159 A * | 4/1982 | Aotsu et al. ........... | 322/19 |
| 4,463,306 A * | 7/1984 | de Mello et al. ....... | 322/25 |
| 4,567,422 A | 1/1986 | Sims | |
| 4,599,552 A | 7/1986 | Phillips et al. | |
| 4,733,156 A * | 3/1988 | Tanaka et al. ......... | 322/20 |
| 4,741,023 A * | 4/1988 | Lawson .............. | 379/106.01 |
| 4,788,619 A * | 11/1988 | Ott et al. ............. | 361/91.1 |
| 4,788,653 A | 11/1988 | Henderson et al. | |
| 4,855,664 A | 8/1989 | Lane | |
| 5,264,778 A | 11/1993 | Kimmel et al. | |
| 5,300,876 A * | 4/1994 | Takagi ................ | 322/58 |
| 5,321,308 A | 6/1994 | Johncock | |
| 5,483,147 A * | 1/1996 | Ilic et al. ............. | 322/25 |
| 5,497,069 A * | 3/1996 | Shriver et al. ........ | 322/19 |
| 5,604,420 A | 2/1997 | Nambu | |
| 5,805,395 A * | 9/1998 | Hu et al. ............. | 361/21 |
| 6,046,917 A | 4/2000 | Gibbs et al. | |
| 6,057,672 A * | 5/2000 | Xia et al. ............ | 322/58 |
| 6,232,751 B1 * | 5/2001 | Farr et al. ............ | 322/59 |
| 6,265,852 B1 * | 7/2001 | Kitamura et al. ...... | 322/59 |
| 6,337,561 B1 * | 1/2002 | Sudou et al. .......... | 322/19 |
| 6,396,247 B1 | 5/2002 | Gibbs et al. | |
| 6,525,504 B1 | 2/2003 | Nygren et al. | |
| 6,762,512 B2 | 7/2004 | Nelson | |
| 6,794,855 B2 * | 9/2004 | Shimomura et al. ..... | 322/59 |
| 6,819,087 B2 * | 11/2004 | Delmerico et al. ..... | 322/58 |

* cited by examiner

*Primary Examiner*—Nicholas Ponomarenko
(74) *Attorney, Agent, or Firm*—Thompson Coburn, LLP; Kevin M. Kercher, Esq.

(57) ABSTRACT

A stabilizer and synchronous electric power generator system using same that provides both power system damping and excitation limiter functionality. The stabilizer includes a processing unit and a memory storing routines executable by the processing unit. The routines are adapted to receive a voltage signal indicative of a voltage and a current signal indicative of a current output by the generator system, generate, utilizing the voltage and current signals, a power system stabilizer signal for damping oscillations and one or more excitation limiter function signals for controlling excitation level. The routines are also adapted to generate a feedback signal for the generator system by combining the power system stabilizer signal and one or more of the one or more excitation limiter function signals.

4 Claims, 1 Drawing Sheet

POWER SYSTEM STABILIZER PROVIDING EXCITATION LIMITER FUNCTIONS

BACKGROUND OF THE INVENTION

1. Field of the Invention

The present invention relates to a stabilizer for a synchronous electric power generator system, and in particular to a power system stabilizer providing both power system damping functionality and excitation limiter functionality from a single unit.

2. Background Information

Synchronous electric power generators are well-known in the art and are used to produce alternating current output voltages, such as single phase or three phase voltage outputs. A typical synchronous electric power generator has a stator and a rotor having a field winding excited by a field voltage provided by an exciter. Current in the rotor creates a rotating magnetic field which induces current in the stator to produce an output voltage at the terminals of the stator. The amount of field voltage provided by the exciter controls the generator field magnetic strength. As the main generator field strength is controlled, so is the generator output voltage induced in the generator stator. In the typical case, the exciter is under the control of an automatic voltage regulator which is connected to the output voltage terminals of the stator. The automatic voltage regulator controls the voltage applied to the exciter which adjusts the generator output voltage by controlling the strength of the main generator field. Many different techniques are used to sample or sense the output voltage and provide feedback to the automatic voltage regulator, one example of which includes detecting the peak of every other half cycle of the output voltage, comparing it with a desired reference value, and then adjusting the exciter voltage up or down as required to correct the generator output voltage.

In modern generator systems, the voltage regulator/exciter system for the generator (typically provided as a single electronic component) also provides various control functions for further controlling the level of excitation and thus the generator field strength. Such functions are commonly referred to as excitation limiter functions and include, without limitation, a minimum excitation limiter (MEL) function, an under excitation limiter (UEL) function, a volts per hertz (VHZ) function, a generator current limiter (GCL) function, and an over excitation limiter (OEL) function.

In addition, in large power generator installations, the utilization of quickly responding electronic equipment for control of the generator field excitation has lead to undesired stimulation of mechanical and electrical resonances resulting in power system oscillations. This problem has been found to be particularly severe when multiple generators are electrically coupled together or when long transmission lines are required to distribute the generator power. The problem is generally overcome by the inclusion of a compensating control element called a power system stabilizer (PSS) in the feedback loop which regulates the generator output. A PSS is an auxiliary control device used with generator excitation systems to provide an additional signal to the voltage regulator to damp the turbine generator to power system electromechanical oscillations. In most systems, the output of the PSS is fed to a summing point within the voltage regulator and serves to modulate the voltage regulator output and thus control the generator excitation such that a damping torque is applied to the generator rotor to control generator oscillations. Operation of a PSS is well understood in the industry and the various implementation means have been well documented. Typically, a PSS takes generator voltage and current (received from voltage and current transducers, respectively) as inputs to generate the auxiliary signal provided to the voltage regulator. In addition, other possible inputs to a PSS include the deviation of the rotation speed of the generator (from a speed transducer) and the deviation of the system frequency.

Most older generator systems (twenty to twenty years old and older typically utilize a voltage regulator/exciter system that is not equipped to provide the excitation limiter functions described above. In addition, such systems do not normally employ a PSS to damp generator oscillations as described above. Thus, an operator of such an older generator system that desires to add excitation limiter and PSS functionality would need to both replace the existing voltage regulator/exciter system with a voltage regulator/exciter system that is equipped to provide the excitation limiter functions and purchase a PSS, even if the existing voltage regulator/exciter system is functioning properly. There is thus a need for a system that can provide both excitation limiter functions and PSS functions in a single unit that may be used, for example, in older generator systems and thereby enable continued use of a properly functioning existing voltage regulator/exciter system.

SUMMARY OF THE INVENTION

These needs, and others, are addressed by the present invention which provides a stabilizer for a synchronous electric power generator system that provides both power system damping functionality and excitation limiter functionality from a single unit. The stabilizer includes a processing unit and a memory storing one or more routines executable by the processing unit. The one or more routines are adapted to receive a voltage signal indicative of a voltage output by the synchronous electric power generator system and a current signal indicative of a current output by the synchronous electric power generator system, generate, utilizing the voltage signal and the current signal, a power system stabilizer signal for damping oscillations in the synchronous electric power generator system and one or more excitation limiter function signals for controlling an excitation level of the synchronous electric power generator system. The routines are also adapted to generate a feedback signal for the synchronous electric power generator system by combining, preferably by summing, the power system stabilizer signal and one or more of the one or more excitation limiter function signals.

The present invention also provides a synchronous electric power generator system including a generator having a rotor and a stator, an exciter operatively coupled to the rotor for exciting a field winding of the rotor, and a voltage regulator in electronic communication with the exciter for applying a voltage to the exciter. The system further includes a stabilizer in electronic communication with the voltage regulator. The stabilizer generates a feedback signal for the voltage regulator by generating a power system stabilizer signal for damping oscillations in the synchronous electric power generator system and one or more excitation limiter function signals for controlling an excitation level of the synchronous electric power generator system and combining, preferably by summing, the power system stabilizer signal and one or more of the one or more excitation limiter function signals. The stabilizer may, in this embodiment, include a processing unit and a memory storing one or more routines executable by the processing unit, wherein the routines are adapted to receive a voltage signal indicative of a voltage output by the generator and a current signal indicative of a current output by the generator, generate the power system stabilizer signal utilizing the voltage signal and the current signal, generate the one or more excitation limiter function signals utilizing the voltage signal and the current signal, and generate the feedback signal by combining the power system stabilizer signal and the one or more of the one or more excitation limiter function signals.

The one or more excitation limiter function signals may include one or more of, and preferably all of, a minimum excitation limiter function signal, an under excitation limiter function signal, a volts per hertz function signal, a generator current limiter function signal, and an over excitation limiter function signal.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
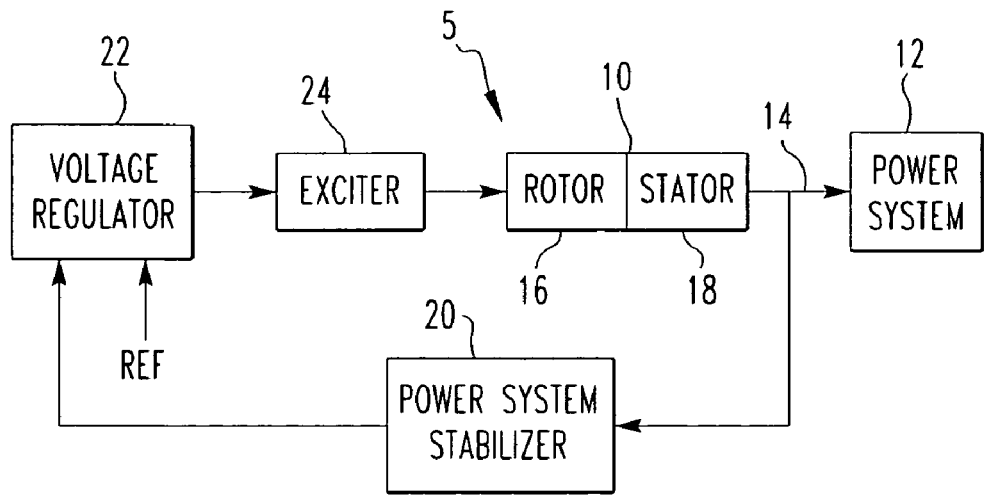
FIG. 1 is a block diagram of synchronous electric power generation system according to the present invention.

FIG. 1 is a block diagram of synchronous electric power generation system 5 including an AC generator 10, typically a three-phase, 60 hertz (Hz) turbine generator, which is coupled to a power utility system 12 via a three-phase transmission line 14. In some countries, 50 hertz electrical power is more common. As seen in FIG. 1, AC generator 10 includes rotor 16 and stator 18. As discussed above, such a system can generate undesired electromechanical oscillation modes which are damped, i.e. suppressed, by means of a power system stabilizer (PSS) 20 according to the present invention. PSS 20 preferably receives the voltage and the current output by AC generator 10 as inputs from, for example, a set of three-phase potential transformers (not shown) and current transformers (not shown). As described above, other inputs, such as generator speed and system frequency, may also be used. The PSS 20 generates a feedback control signal, described in greater detail below in connection with FIG. 2, which is fed to an automatic voltage regulator 22 which controls the exciter 24 for the AC generator 10. As is known in the art, an isolator box (not shown) may be provided between PSS 20 and voltage regulator 22 to provide electrical isolation between the two components.

Figure 2:
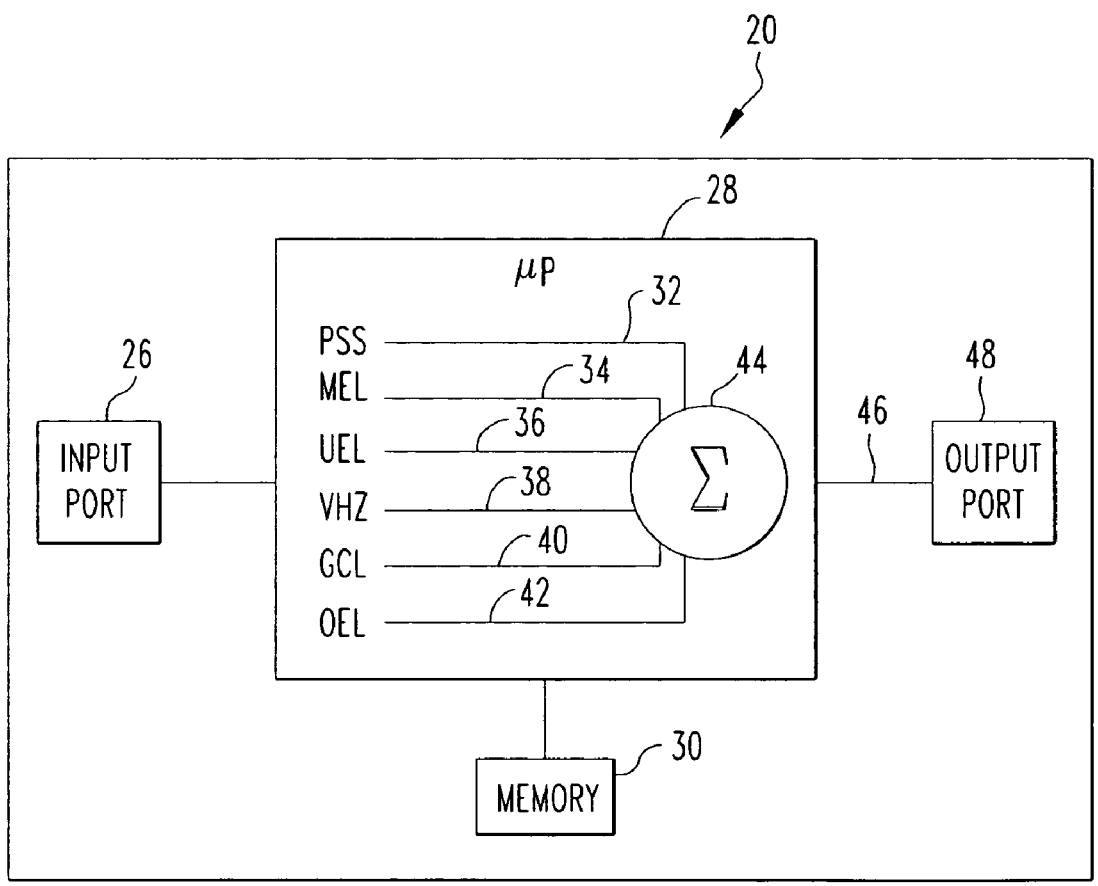
FIG. 2 is a block diagram of a power system stabilizer having built in excitation limiter functions according to the present invention.

Referring to FIG. 2, a block diagram of PSS 20 according to the present invention is shown. PSS 20 is an electrical component that provides both a PSS function for damping power system oscillations and a number of excitation limiter functions. PSS 20 includes input port 26 for receiving as inputs the voltage and the current output by AC generator 10. Input port 26 is in electronic communication with processing unit 28 which may be, for instance, and without limitation, a microprocessor (μP). PSS 20 further includes a memory 30 in electronic communication with processing unit 28. The memory 30 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. The memory 30 additionally stores a number of routines executable by processing unit 28 for the processing of data. The routines can be in any of a variety of forms such as, without limitation, software, firmware, and the like. The routines include one or more routines for generating a PSS function signal 32 for damping the turbine generator to power system electromechanical oscillations. A number of methods for generating a signal for damping turbine generator to power system electromechanical oscillations are well known in the art, any of which may be employed in the present invention. For example, such methods are described in U.S. Pat. No. 4,855,664, entitled "Method and Apparatus for Damping Oscillations of an AC Generator," and U.S. Pat. No. 4,999,564, entitled "Power System Stabilizer System Having Improved Integrity Checking Scheme," the disclosures of which are incorporated herein by reference.

In addition, the routines stored in memory 30 include one or more routines for generating one or more of, and preferably all of, a minimum excitation limiter (MEL) function signal 34, an under excitation limiter (UEL) function signal 36, a volts per hertz (VHZ) function signal 38, a generator current limiter (GCL) function signal 40, and an over excitation limiter (OEL) function signal 42. MEL is a function that is utilized to maintain excitation above a predetermined KVA characteristic, and thus prevent the generator from reaching under-excited conditions that could endanger its synchronization with the power system. In order for a synchronous machine to stay in synchronism with a fixed field voltage, certain relationships between terminal voltage, real power, and reactive power must exist. This relationship is typically known in the art as a steady-state stability limit curve. UEL is a function that is utilized to maintain excitation above a predetermined KVA characteristic, and thus prevent the generator from reaching under-excited conditions that could exceed the capabilities of the generator. This relationship is typically known in the art as a capability curve. VHZ is a function that is utilized to detect the ratio of the generator terminal voltage to the operating frequency and functions only when the measured voltage and frequency are a predetermined amount, such as 10%, above their normal values. Excessive voltage at off-frequency operation will typically result in eddy current and magnetic hysteresis losses which in turn cause over heating of the generator and/or unit transformer iron. The ratio of voltage to frequency is typically calculated by taking the highest rms voltage of the three generator voltage phases and dividing by the system frequency. GCL is a function that is designed to limit the magnitude of the current in the armature of the rotating machine. When the machine is overexcited, the GCL serves to reduce the excitation to the field. When the machine is underexcited, the GCL serves to increase excitation to the field. OEL is a function designed to quickly limit the magnitude of the field current or voltage applied to the generator field when the measured field current or voltage exceeds a predetermined level. Many different methods and algorithms are well known in the art for generating these function signals, any of which may be employed in connection with the present invention. For example, methods for generating such signals are described in U.S. Pat. No. 4,245,182, entitled "Excitation Control Apparatus for a Generator," U.S. Pat. No. 5,264,778, entitled "Apparatus Protecting a Synchronous Machine from Under Excitation," and Instruction Leaflet ECMLBS301 published by the assignee of the present invention, the disclosures of which are incorporated herein by reference.

Processing unit 28 of PSS 20 also includes a combining function 44 that receives as inputs the PSS function signal 32, and one or more of and preferably all of, the minimum excitation limiter (MEL) function signal 34, the under excitation limiter (UEL) function signal 36, the volts per hertz (VHZ) function signal 38, the generator current limiter (GCL) function signal 40, and the over excitation limiter (OEL) function signal 42, and generates a combined feedback signal 46. Combined feedback signal 46 is a signal resulting from the combination of the PSS function signal 32, and one or more of, and preferably all of, the minimum excitation limiter (MEL) function signal 34, the under excitation limiter (UEL) function signal 36, the volts per hertz (VHZ) function signal 38, the generator current limiter (GCL) function signal 40, and the over excitation limiter (OEL) function signal 42 according to a set of preset logic or rules, many of which are well known in the art, and any of which may be utilized in the present invention. In the preferred embodiment of the present invention, combining function 44 generates combined feed back signal 46 by summing the PSS function signal 32, the minimum excitation limiter (MEL) function signal 34, the under excitation limiter (UEL) function signal 36, the volts per hertz (VHZ) function signal 38, the generator current limiter (GCL) function signal 40, and the over excitation limiter (OEL) function signal 42 as seen in FIG. 2.

In an alternate embodiment of the present invention, summing function 44 generates combined feedback signal 46 by using both the minimum excitation limiter (MEL) function signal 34 and the volts per hertz (VHZ) function signal 38. The volts per hertz (VHZ) function signal 38 will modify the summing junction 44 when the generator 10 is energized, regardless of the status of the generator breaker (not shown). The minimum excitation limiter (MEL) function signal 34 only modifies the summing function 44 when the generator 10 is "on-line" or connected to the power system 12. In the case that the PSS function signal 32 is driving the excitation to be lower than it should be, the minimum excitation limiter (MEL) function signal 34 would counteract by providing a signal to increase the combined feedback signal 46 output at output port 48. The net result is to keep the generator 10 properly excited. The PSS function signal 32 would typically have an average positive or negative output during load change conditions. In the case that the voltage to frequency ratio becomes excessively high, the volts per hertz (VHZ) function signal 38 will become progressively more negative, providing a signal to reduce the combined feedback signal 46 output at output port 48. This will result in a signal to reduce the excitation and keep the volts per hertz ratio of the generator 10 within limits. During the time that volts per hertz ratio is excessive, the PSS component of the combined feedback signal 46 will still be responding to damp out watt oscillations.

Processing unit 28 outputs combined feedback signal 46 to output port 48, which in turn is in electronic communication with voltage regulator 22 shown in FIG. 1. Combined feedback signal 46 is a feedback control signal for voltage regulator 22 that provides both PSS functionality/control and excitation limiter functionality/control to voltage regulator 22 and thus exciter 24, all from a single electrical component (PSS 20). As such, PSS 20 may be used to provide both PSS functionality/control and excitation limiter functionality/control to a properly functioning, existing voltage regulator/exciter system of an older synchronous electric power generator system. As a result, an operator of such a synchronous electric power generator system that desires to add both PSS functionality/control and excitation limiter functionality/control to the system need not replace the existing voltage regulator/exciter system, and instead need only add a single component (PSS 20).

While specific embodiments of the invention have been described in detail, it will be appreciated by those skilled in the art of various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A stabilizer for a synchronous electric power generator system, comprising:
    a processing unit;
    a memory, said memory storing a routine executable by said processing unit, said routine:
    receiving a voltage signal indicative of a voltage output by said synchronous electric power generator system and a current signal indicative of a current output by said synchronous electric power generator system;
    generating a power system stabilizer signal utilizing said voltage signal and said current signal for damping oscillations in said synchronous electric power generator system;
    generating an excitation limiter function signal utilizing said voltage signal and said current signal for controlling an excitation level of said synchronous electric power generator system;
    generating a feedback signal for said synchronous electric power generator system by combining said power system stabilizer signal and said excitation limiter function signal; and
    said excitation limiter function signal comprising a minimum excitation limiter function signal, an under excitation limiter function signal, a volts per hertz function signal, a generator current limiter function signal, and an over excitation limiter function signal.

2. The stabilizer according to claim 1, summing said power system stabilizer signal, said minimum excitation limiter function signal, said under excitation limiter function signal, said volts per hertz function signal, said generator current limiter function signal, and said over excitation limiter function signal.

3. A synchronous electric power generator system, comprising:
    a generator having a rotor and a stator;
    an exciter operatively coupled to said rotor, said exciter exciting a field winding of said rotor;
    a voltage regulator in electronic communication with said exciter, said voltage regulator applying a voltage to said exciter;
    a stabilizer in electronic communication with said voltage regulator, said stabilizer generating a feedback signal by generating a power system stabilizer signal for damping oscillations in said synchronous electric power generator system and an excitation limiter function signal for controlling an excitation level of said synchronous electric power generator system and combining said power system stabilizer signal and said excitation limiter function signal, said voltage regulator receiving said feedback signal from said stabilizer; and
    said excitation limiter function signal comprising a minimum excitation limiter function signal, an under excitation limiter function signal, a volts per hertz function signal, a generator current limiter function signal, and an over excitation limiter function signal.

4. The synchronous electric power generator system according to claim 3, summing said power system stabilizer signal, said minimum excitation limiter function signal, said under excitation limiter function signal, said volts per hertz function signal, said generator current limiter function signal, and said over excitation limiter function signal.

* * * * *